US008868347B2

(12) United States Patent
Geerits

(10) Patent No.: US 8,868,347 B2
(45) Date of Patent: Oct. 21, 2014

(54) FORWARD ELASTIC SCATTERING IN BOREHOLE ACOUSTICS

(75) Inventor: Theodorus W. Geerits, Niedersachsen (DE)

(73) Assignee: Baker Hughes Incorporated, Houston, TX (US)

(*) Notice: Subject to any disclaimer, the term of this patent is extended or adjusted under 35 U.S.C. 154(b) by 471 days.

(21) Appl. No.: 13/345,510

(22) Filed: Jan. 6, 2012

(65) Prior Publication Data

US 2013/0179082 A1    Jul. 11, 2013

(51) Int. Cl.
*G01V 1/40* (2006.01)
*G06F 11/00* (2006.01)

(52) U.S. Cl.
USPC ............... 702/11; 702/12; 702/13; 702/188

(58) Field of Classification Search
CPC ........... G06F 17/00; G01V 1/42; G01V 1/28; G01V 1/303
USPC ..................... 702/11–14, 188–190
See application file for complete search history.

(56) References Cited

U.S. PATENT DOCUMENTS

| | | | |
|---|---|---|---|
| 6,125,330 A * | 9/2000 | Robertson et al. | 702/14 |
| 7,715,985 B2 * | 5/2010 | Van Manen et al. | 702/14 |
| 2010/0067328 A1 | 3/2010 | Curtis | |
| 2010/0161235 A1 * | 6/2010 | Ikelle | 702/17 |
| 2010/0202250 A1 * | 8/2010 | Kitchenside et al. | 367/21 |

OTHER PUBLICATIONS

International Search Report PCT/US2012/069196 Mar. 28, 2013.*

Beylkin, G. et al.; "Linearized Inverse Scattering Problems in Acoustics and Elasticity," Wave Motion 12 (1990), North-Holland, pp. 15-52.
deHoop, Adrianus T.; "Reciprocity theorems for acoustic wave fields in fluid/solid configurations," J. Acoust. Soc. Am 87 (5), May 1990, pp. 1932-1937.
Beylkin, G.; "Imaging of discontinuities in the inverse scattering problem by inversion of a causal generalized Radon transform," J. Math. Phys. 26 (1), Jan. 1985, pp. 99-108.
Miller, D. et al.; "A new slant on seismic imaging: Migration and integral geometry," Geophysics, vol. 52, No. 7 (Jul. 1987), pp. 943-964.
Yang, Jiaqi et al.; "A CG-FFT approach to the solution of a stress-velocity formulation of three-dimensional elastic scattering problems," Journal of Computational Physics 227 (2008), pp. 10018-10039.
International Search Report and Written Opinion dated Mar. 28, 2013 for International Application No. PCT/US2012/069196; all references in PCT are cited above.

* cited by examiner

*Primary Examiner* — Phuong Huynh
(74) *Attorney, Agent, or Firm* — Cantor Colburn LLP

(57) ABSTRACT

A method and computer-readable medium for determining a scattered wave particle velocity for a formation is disclosed. In aspects, the method may include: defining an embedded grid of the formation, and defining a contrast grid of the formation that includes a contrast feature of the formation; calculating a Green's function over the embedded grid; calculating a first scattering vector of the contrast feature for a first offset between the embedded grid and the contrast grid; determining the scattered wave particle velocity for the contrast feature at the first offset using the calculated Green's function and the first scattering vector; calculating a second scattering vector of the contrast feature for a second offset between the embedded grid and the contrast grid; and determining the scattered wave particle velocity for the contrast feature at the second offset is determined using the calculated Green's function and the second scattering vector.

15 Claims, 5 Drawing Sheets

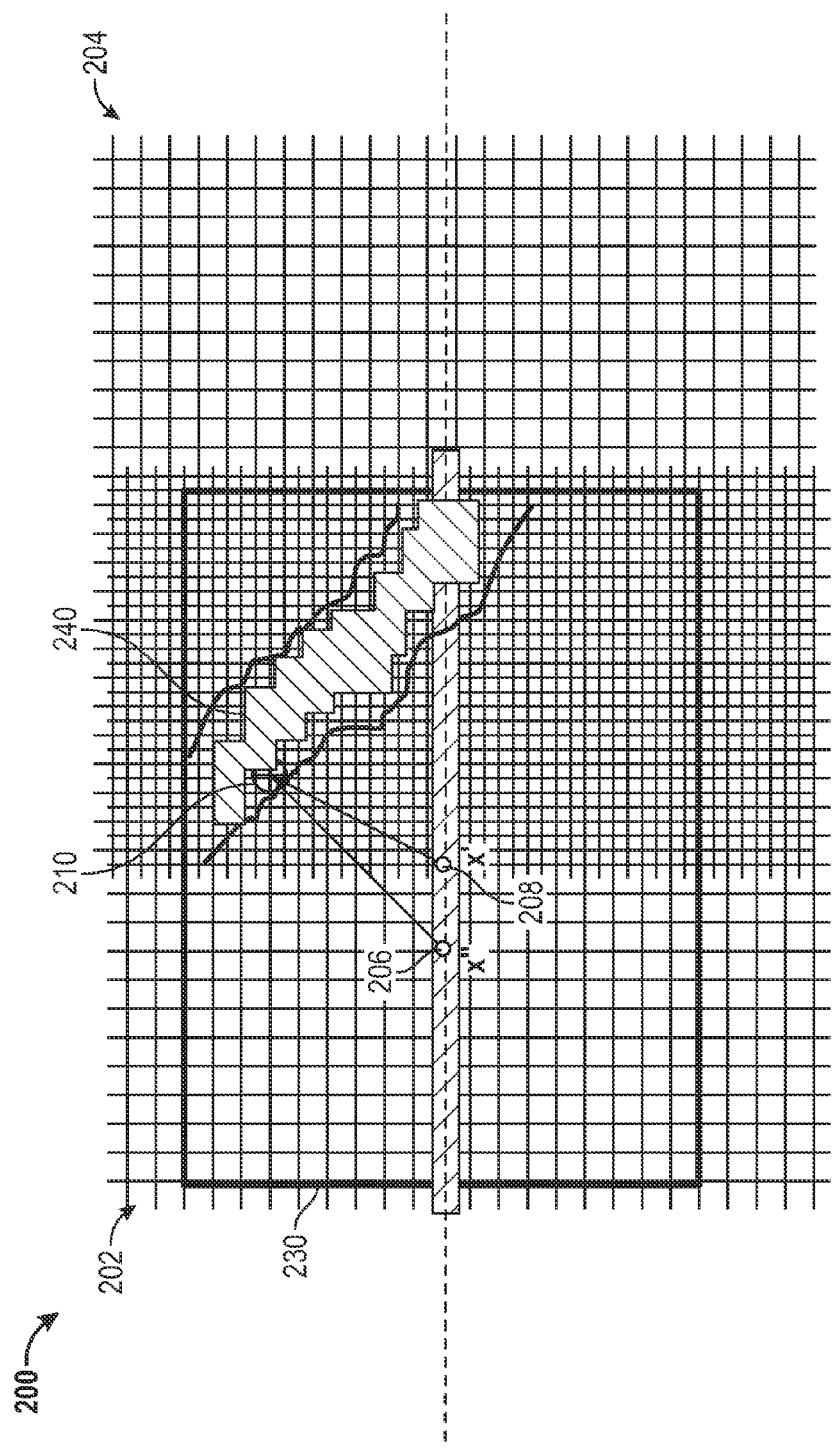

US 8,868,347 B2

FORWARD ELASTIC SCATTERING IN BOREHOLE ACOUSTICS

BACKGROUND OF THE DISCLOSURE

1. Field of the Disclosure

The present disclosure relates to a method and apparatus for determining a scattered wave particle velocity for imaging a formation.

2. Description of the Related Art

In borehole acoustic logging-while-drilling and wireline logging, there is an ever increasing demand for imaging structural features in a formation away from a borehole. Imaging is an inversion process, based on an inverse model which aims at reconstructing contrasts in medium parameters related to structural features of the formation from a known or measured scattered wavefield which finds its origin at points located in the formation. The scattered wavefield results from an interaction of an incident wavefield with the structural feature (scatterer). The incident wavefield is generated by known sources, which in case of a borehole acoustic logging-while-drilling or wireline configuration are typically located on a borehole tool surrounded by borehole fluid. Associated with the inverse model is a forward model that predicts the scattered wavefield given a known contrast in medium parameters. An actual measurement in the borehole of pressure and/or particle velocity, for example, provides a total wave field that is the sum of the incident wavefield and scattered wavefield. Current methods (e.g., Finite Difference, Finite Elements) for calculating the total wavefield are time-intensive, since these methods require the calculation of a new model at each location of the borehole tool in the borehole. The present disclosure provides a method that reduces the computational burden for calculating incident and scattered wavefields.

SUMMARY OF THE DISCLOSURE

In one aspect, the present disclosure provides a method of determining a scattered wave particle velocity for a formation, including: defining an embedded grid of the formation; defining a contrast grid of the formation that includes a contrast feature of the formation; calculating a Green's function over the embedded grid; calculating a first scattering vector of the contrast feature for a first offset between the embedded grid and the contrast grid; determining the scattered wave particle velocity for the contrast feature at the first offset using the calculated Green's function and the first scattering vector; calculating a second scattering vector of the contrast feature for a second offset between the embedded grid and the contrast grid; and determining the scattered wave particle velocity for the contrast feature at the second offset using the calculated Green's function and the second scattering vector.

In another aspect, the present disclosure provides a computer-readable medium having instructions stored therein and accessible to a process to enable the processor to perform a method for determining a scattered wave particle velocity for a formation, wherein the method includes: defining an embedded grid of the formation; defining a contrast grid of the formation that includes a contrast feature of the formation; calculating a Green's function over the embedded grid; calculating a first scattering vector of the contrast feature for a first offset between the embedded grid and the contrast grid; determining the scattered wave particle velocity for the contrast feature at the first offset using the calculated Green's function and the first scattering vector; calculating a second scattering vector of the contrast feature for a second offset between the embedded grid and the contrast grid; and determining the scattered wave particle velocity for the contrast feature at the second offset using the calculated Green's function and the second scattering vector.

Examples of certain features of the methods disclosed herein are summarized rather broadly in order that the detailed description thereof that follows may be better understood. There are, of course, additional features of the methods disclosed hereinafter that will form the subject of the claims.

BRIEF DESCRIPTION OF THE DRAWINGS

For detailed understanding of the present disclosure, references should be made to the following detailed description, taken in conjunction with the accompanying drawings, in which like elements have been given like numerals and wherein:

FIG. 2A shows the exemplary grid system 200 of FIG. 2 including a formation feature according to an embodiment of the present disclosure;

DETAILED DESCRIPTION OF THE DISCLOSURE

Figure 1:
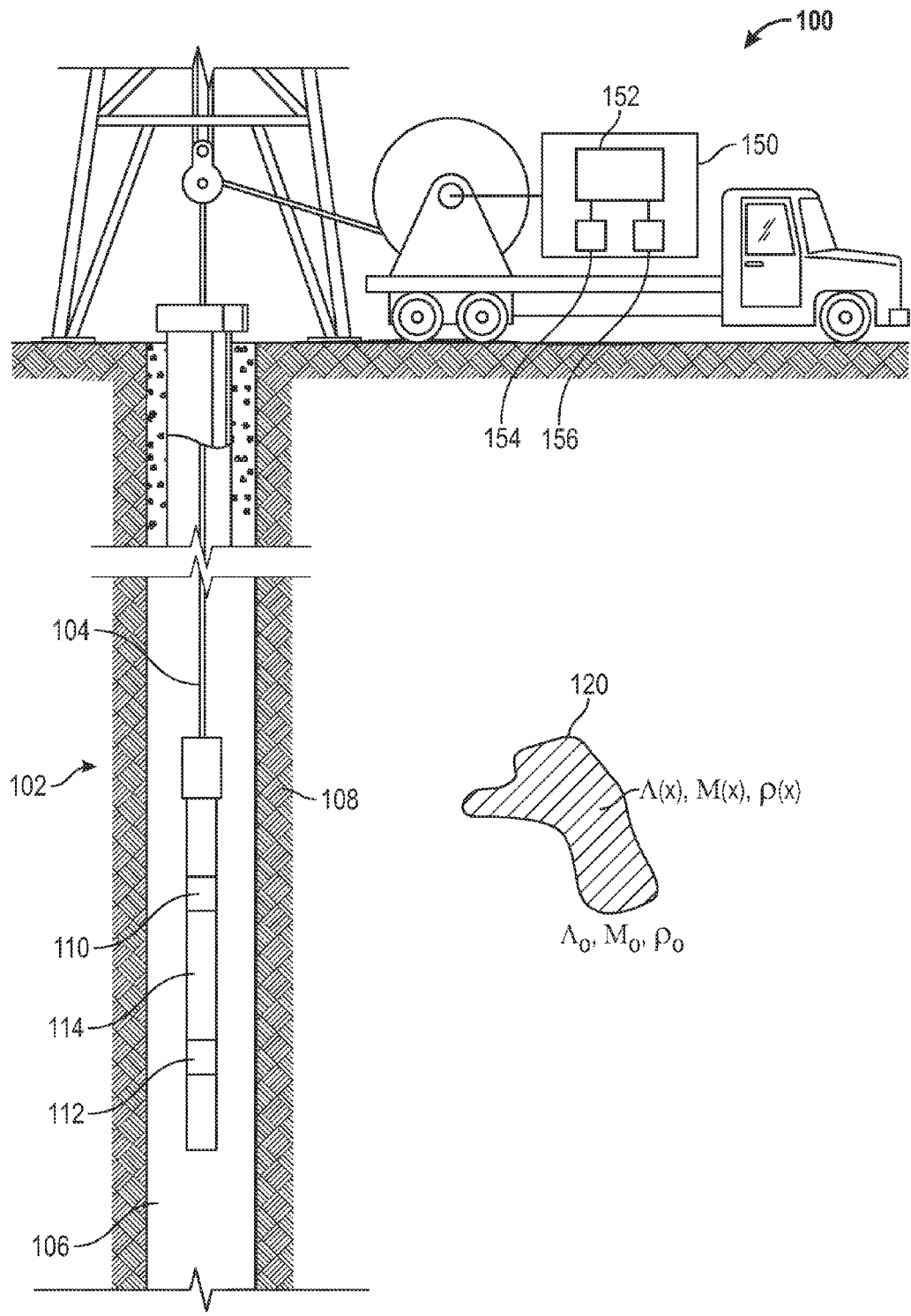
FIG. 1 shows an exemplary system that employs a borehole tool to obtain a formation image according to one embodiment of the present disclosure.

FIG. 1 shows an exemplary system 100 employing a borehole tool to obtain a formation image in one embodiment of the present disclosure. The exemplary system 100 includes a wireline device 102 suspended by a cable 104 lowered through a borehole 106 in the formation 108. The formation 108 has a homogeneous region identified by various exemplary parameters ($\Lambda_0$, $M_0$, $\rho_0$) representing bulk modulus, shear modulus and density of the formation, for example. These exemplary parameters are the same at all locations in a homogeneous formation. The formation 108 also is shown to include a contrast feature 120 which may be an inclusion, a formation fracture, a salt flank, etc. Exemplary parameter values ($\Lambda(x)$, $M(x)$, $\rho(x)$) representing bulk modulus, shear modulus and density of the contrast feature. The parameter values ($\Lambda(x)$, $M(x)$, $\rho(x)$) are spatially dependent. In various aspects, the present disclosure provides a method for modeling the scattered wavefield originating from the contrast feature.

The exemplary wireline device 102 includes at least one acoustic transmitter (acoustic source) 110 and at least one acoustic receiver 112 separated from the acoustic source 110 at a selected distance along the longitudinal axis of the wireline device 102. The acoustic source 110 and the acoustic receiver 112 are typically separated by an acoustic isolator section 114. The at least one acoustic source and the at least one acoustic receiver may be deployed against the borehole wall in one embodiment of the present disclosure. In various embodiments, the at least one acoustic source 110 may include multiple acoustic sources axially separated along the longitudinal axis. An acoustic source may include for example, a monopole acoustic transmitter, a dipole acoustic transmitter, a quadrupole acoustic transmitter, etc. The at least one acoustic source 110 may transmit an acoustic wave at one or more acoustic frequencies as well as may be oriented along one or more polarization directions. Similarly, the at least one acoustic receiver 112 may include a plurality of receivers aligned along the longitudinal axis and may include monopole, dipole, quadrupole receivers, etc. The acoustic receiver 112 is configured to receive acoustic waves at a number of frequencies and polarization directions. In an embodiment of the present disclosure, the at least one acoustic receiver 112 receives signals from the formation and/or borehole in response to an acoustic signal transmitted into the formation by the at least one acoustic source 110. In one aspect, the acoustic source and acoustic receiver are in communication with a control unit 150 at a surface location via cable 104. The control unit 150 typically includes a memory 154, a set of programs 156 storing instructions therein for controlling operation of the acoustic source and the acoustic receiver and for processing the various signals received from the acoustic receiver to determine a scattered wave particle velocity using the methods described herein, and a processor 152 having access to the set of programs 156 and to the contents of the memory 154. In one aspect, the processor 152 is configured to run the various programs 156 to process the receiver signals according to the methods described herein. In one embodiment, the processor may include a plurality of processors using parallel processing techniques to perform calculations. In alternate embodiments, the processor, programs and memory may be included in the wireline device.

In the exemplary embodiment of FIG. 1, the borehole tool is a wireline device. In alternate embodiments, the borehole tool may include a measurement-while drilling ("MWD") or logging-while-drilling ("LWD") tool. In various embodiments, a processor may be included in the MWD or LWD tool. Therefore, the methods disclosed herein may be performed during drilling and the results of the calculations obtained via these methods may be used to direct the drilling operation.

Figure 2:
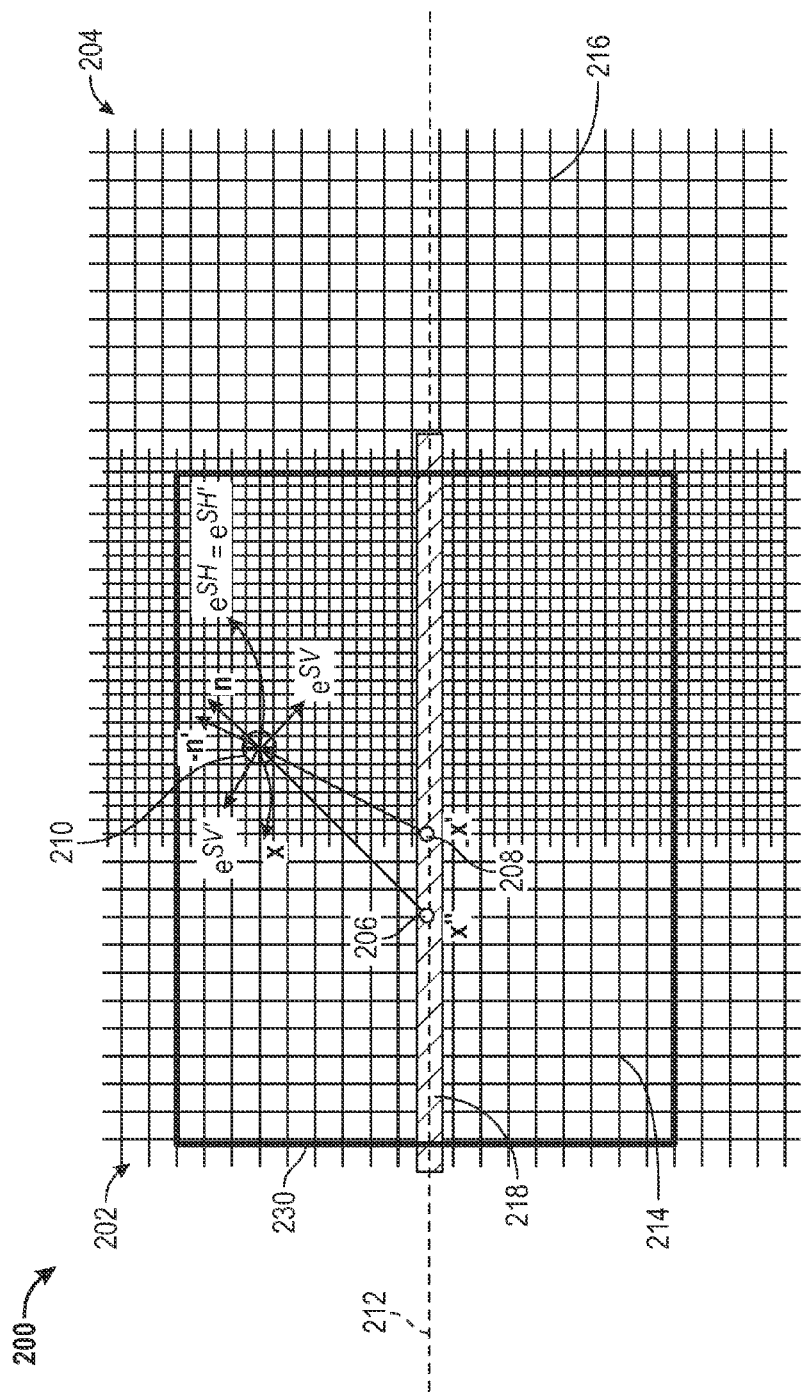
FIG. 2 shows an exemplary embodiment of a grid system suitable for imaging a formation and for determining a total wave particle velocity for the formation according to an embodiment of the present disclosure.

FIG. 2 shows an exemplary embodiment of a grid system 200 suitable for calculating a total wave particle velocity in a fluid-filled borehole. The grid system 200 includes a first grid 202 and a second grid 204 movable relative to the first grid 202. The first grid 202, also referred to herein as the "embedding", represents a first reference frame centered on a borehole tool movable within the formation along a borehole axis 212. In one embodiment, the first grid includes a fluid-filled borehole 218 along the borehole axis 212 that belongs to the embedding, and the methods disclosed herein may be performed to include the effects of the borehole. The borehole may contain wave fields having various borehole modes (e.g., Stoneley waves, flexural waves, refracted P-waves and refracted S-waves). In another embodiment, the first grid may not have a borehole. The second grid 204 also referred to herein as the "contrast grid" or the "geology", represents a second reference frame fixed in the formation. Motion of the borehole tool through the formation may thus be represented via a motion of the first grid with respect to the second grid. The horizontal and vertical lines of the grids form grid blocks. A grid location of the first grid is indicated by an intersection of a horizontal line of the first grid with a vertical line of the first grid, such as the exemplary grid location 214. Similarly, a grid location of the second grid is indicated by an intersection of a horizontal line of the second grid with a vertical line of the second grid, such as the exemplary grid location 216. The sizes of the grid blocks of the first grid 202 and of the second grid 204 (i.e., the grid resolutions) are typically selected by an operator and are typically the same size. In general, the size of each grid block is selected to be less than the smallest wavelength of a wave obtained in seismic logging. A typical ratio is about 10 gridblocks per wavelength. The first grid 202 and the second grid 204 are shown as two-dimensional grids in FIG. 2 for illustrative purposes only. Typically, the first grid 202 and the second grid 204 are three-dimensional grids representing formation volumes.

In FIG. 2, the first grid 202 includes a source location (x") 206 and a receiver location (x') 208 along borehole axis 212. The source location 206 indicates a location of the acoustic source (110, FIG. 1) on the borehole tool. The receiver location 208 indicates a location of the acoustic receiver (112, FIG. 1) of the borehole tool. The first grid 202 also includes a plurality of image locations (x), such as the exemplary image location 210. An image location is a grid location that receives and scatters an incident acoustic wave. The acoustic source generates an acoustic wave field ("the incident wave field") that propagates through the formation. The acoustic wave field may include any number of polarizations $\xi$. Typical polarizations $\xi$ include compressional (P-waves), horizontally polarized shear waves (SH waves) and vertically polarized shear waves (SV waves), for example. A scattering vector is introduced that mediates the interaction between the incident and scattered wave, given a source, receiver and image point location. Typically this vector consists of at least three entities: an incident wave (scalar) direction associated with the source; a cosine of an angle between the incident and scattered ray vector at the image location; and a geometrically weighted medium contrast function including various perturbation parameters of a contrast feature at the image location. The local direction of the scattering vector is given by the scattered polarization vector.

FIG. 2A shows the exemplary grid system 200 of FIG. 2 including an exemplary contrast feature. The contrast feature 240 represents a contrast in formation medium parameters and is defined by perturbation parameters discussed below. The perturbation parameters may be determined, for example, from seismic logging. The contrast feature is represented in the contrast grid of the grid system. Thus, a particular offset between the embedded grid and the contrast grid represents a selected tool position between the borehole tool and the contrast feature. Parameter values for the background and perturbation values fo the contrast feature are assigned to image point locations associated with the first and second grid, respectively. Exemplary parameters include bulk modulus A, shear modulus M, and density $\rho$, for example. The first (embedded) grid, which includes the homogeneous background of the formation, has a set of homogeneous parameter values $(\Lambda_0, M_0, \rho_0)$ assigned at all image locations of the first grid. Perturbation values of the parameters $(\delta\Lambda(x), \delta M(x), \delta\rho(x))$ resulting from the presence of the contrast feature in the formation are assigned to the second grid. The perturbation values are generally dependent on the grid location and are defined by the following equations:

$$\delta\Lambda(x) = \frac{\Lambda(x)}{\Lambda_0} - 1 \qquad \text{Eqs. (1)}$$

$$\delta M(x) = \frac{M(x)}{M_0} - 1$$

-continued $$\delta\rho(x) = \frac{\rho(x)}{\rho_0} - 1$$

where $\Lambda(x)$ is the bulk modulus of the contrast feature, $M(x)$ is the shear modulus of the contrast feature, and $\rho(x)$ is the density of the contrast feature. The separation of the parameters among the first grid and the second grid as disclosed above reduces calculation times for the methods of the present disclosure over prior art methods. Measurements obtained at the acoustic receiver are a superposition of an incident wave field and a scattered wave field, where the incident wave field is parameterized by the embedding parameters, ($\Lambda_0$, $M_0$, $\rho_0$) only and where the scattered wave field is parameterized by the perturbation parameters, ($\delta\Lambda(x)$, $\delta M(x)$, $\delta\rho(x)$). In the absence of any contrast feature in the formation, perturbation parameters vanish and consequently there is no scattered wavefield. When calculating a scattering vector at a selected image location, the contrast grid and the embedded grid are moved to a selected offset representative of the location of the borehole tool with respect to the contrast feature. Perturbation values at the image location used in calculating the scattering vector are given by $\delta P=(\delta\Lambda(x), \delta M(x), \delta\rho(x))$. The perturbation parameters pertain to the contrast grid at the image location for the particular offset.

Figure 3:
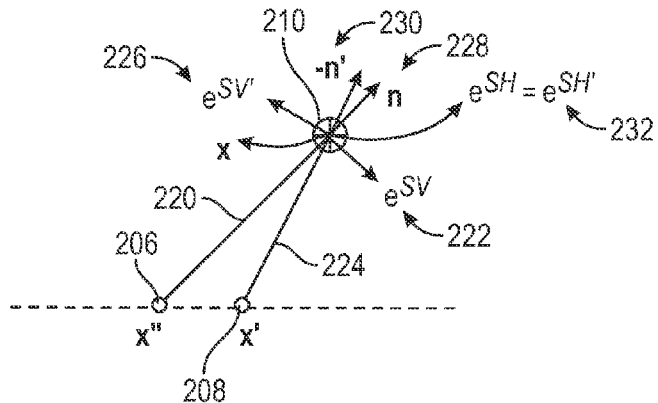
FIG. 3 shows a source location, receiver location and image point location and their associated wave fields for the grid system of FIG. 2.

FIG. 3 shows the source location 206, receiver location 208 and image location 210 and associated wave fields from the grid system of FIG. 2. Vector 220 indicates a direction of propagation along unit vector $\hat{n}$ 228 of an incident wave field from the source location 206 to the image location 210. Exemplary polarization directions are shown for the incident wave field. Vector $e^{SV}$ 222 is a unit vector for a shear vertically-polarized incident wave. Vector $e^{SH}$ 232 is a unit vector for a shear horizontally-polarized wave. Vector 224 indicates a scattered wave propagated from image point 210 to receiver location 208. Vector $-\hat{n}'$ 230 is a unit vector of the direction of propagation of the scattered wave. Here, $-\hat{n}'$ points from the receiver location to the image location. Vector $e^{SV'}$ 226 is a unit vector for a shear vertically-polarized scattered wave, and vector $e^{SH'}$ 232 is a unit vector for a shear horizontally-polarized wave. The incident wave and the scattered wave may be determined at one or more image locations of the first grid 202. In various aspects, the incident and scattered waves may have different polarizations. Possible pairing of polarizations include {(P, P), (P, SV), (SV, P), (SV, SV), (SH, SH)}, wherein the first element of the ordered pair refers to the polarization of the incident wave and the second element of the order pair refers to the polarization of the scattered wave.

Referring back to FIG. 2, a scattering volume 230, also referred to herein as an "integration volume", is defined over the first grid 202. Scattering volume 230 contains those image points that are used to perform the various calculations of the present disclosure. In general, image points that are outside of the scattering volume are not used. Therefore, in one embodiment of the present disclosure, incident wave field values and scattered wave field values are not determined for image locations outside of the scattering volume. The size or extent of the scattering volume 230 is typically determined by a measurement recording time of the acoustic receiver.

In one aspect, the present disclosure determines a total wave particle velocity of the formation determined using the methods described herein. In Eq. (2), the total wave particle velocity is shown as a summation of an incident wave particle velocity and a scattered wave particle velocity:

$$\hat{v}^{\odot\oplus}(x';x'')=\hat{v}^{inc\cdots;\odot\oplus}(x';x'')+\hat{v}^{SC;\odot\oplus}(x';x'') \qquad \text{Eq. (2)}$$

where $\hat{v}^{\odot\oplus}(x'; x'')$ is the total wave particle velocity, $\hat{v}^{inc\cdots;\odot\oplus}(x'; x'')$ is the incident wave particle velocity pertaining to the embedding (i.e., the particle velocity that would be present in the absence of a contrast feature in the formation), and $\hat{v}^{SC;\odot\oplus}(x'; x'')$ is the scattered wave particle velocity. The scattered wave particle velocity is zero when there is no contrast between the embedding and the geology, or in other words, when the formation is homogeneous. A contrast feature in the formation causes the scattered wave particle velocity to be non-zero.

The incident wave particle velocity $\hat{v}^{inc\cdots;\odot\oplus}(x'; x'')$ is determined using source and receiver locations, polarization vectors and homogeneous parameter values ($\Lambda_0$, $M_0$, $\rho_0$). According to the methods of the present disclosure, these values are assigned entirely to the first grid and are therefore independent of offset between the first grid and the second grid. Therefore, the incident wave particle velocity $\hat{v}^{inc\cdots;\odot\oplus}(x'; x'')$ may be determined once and may be used at a plurality of offsets between the first grid and the second grid. Typically, the incident wave particle velocity is determined prior to determining the scattered wave particle velocity and is stored to a memory location for use in subsequent calculations.

The scattered wave particle velocity $\hat{v}^{SC;\odot\oplus}(x'; x'')$ is determined using source image and receiver locations and polarization vectors of the first grid and perturbation parameters ($\delta\Lambda(x)$, $\delta M(x)$, $\delta\rho(x)$) of the second grid, as discussed below. Each offset between the first grid and the second grid aligns a different perturbation value of the second grid with a selected image location of the first grid. Therefore, the scattered wave particle velocity depends on the offset between the second grid and the first grid and is recalculated for each offset by shifting the second grid relative to the first grid ("updating the offset").

The scattered wave particle velocity is given by Eq. (3):

$$\hat{v}^{SC;\odot\oplus}(x')=\hat{T}\int_{x\in D^{SC}\cap D}\hat{G}_\odot(x,x'')A^{\odot\oplus}(x'',x,x';\xi,\delta P)\hat{G}_\oplus(x',x)dV(x) \qquad \text{Eq. (3)}$$

where $\hat{T}$ is the source signature, $D^{SC}\cap D$ is the integration volume, $\hat{G}_\odot(x; x'')$ is a Green's function for the incident wave field, $\hat{G}_\oplus(x', x)$, is a Green's function for the scattered wave field and $A^{\odot\oplus}(x'', x, x'; \xi, \delta P)$ represents a scattering vector related to the contrast feature. Index $\odot$ indicates a polarization direction of the incident wave, and index $\oplus$ indicates a polarization direction of the scattered wave. The Green's functions $\hat{G}_\odot(x, x'')$ and $\hat{G}_\oplus(x', x)$ and polarization vectors $\xi$ are defined at the image points of the first grid and thus are completely defined within the embedding. A Green's function is generally formed of spatial coordinates along with polarization vectors when applicable and solves inhomogeneous differential equations subject to selected boundary conditions. The Green's functions used herein may be selected from a class of functions (i.e., transfer functions) that related a wave amplitude and phase at a first location to a wave amplitude and phase at a second location. For the incident wave field the first location is the source location and the second location is the image location. For the scattered wave field, the first location is the image location and the second location is the receiver location. Scattering vector $A^{\odot\oplus}(x'', x, x'; \xi, \delta P)$ includes components ($x'', x, x'; \xi$) defined within the embedding (first grid), and components ($\delta P$)=($\delta\Lambda(x), \delta M(x), \delta\rho(x)$) defined within the geology (second grid). The Green's functions can be calculated once and used at all applicable offsets between the first and second grid. The scattering vector is the only component of the integrand that is recalculated for each tool position. Thus, calculation time of the scattered wave particle velocity using the methods discussed herein is reduced significantly in comparison to prior art methods. The scattered wave particle velocity can be calculated using a first order (Born) elastic scattering approximation for fluid/solid configurations Referring again to the scattered wave particle velocity, an exemplary method for determining the scattered wave particle velocity of Eq. (3) is discussed below. An embedded grid of the formation and a contrast grid of the formation are defined. The embedded grid is defined to represent a homogenous formation as well to include a source location and a receiver location. The contrast grid is defined to represent a contrast feature of the formation. The Green's functions at an image location are calculated over the embedded grid. The embedded grid and the contrast grid are positioned at a selected offset, and the scattering vector is determined for at least one image location for the selected offset. The scattered wave particle velocity at the selected offset is determined using the determined Green's functions and scattering vector by summing the integrand shown in Eq. (3) over the image locations within integration volume 230. The embedded grid and the contrast grid may be then positioned at another offset, and the scattering vector is determined for the at least one image location at the other offset. The scattered wave particle at the other offset is determined using the determined Green's functions and scattering vector determined for the other offset by summing the integrand shown in Eq. (3) over the image locations within integration volume 230.

Since the variables involved in determining the Green's functions, i.e., source location, image location, receiver location, polarization direction, are represented entirely in the first grid, this calculation can be performed once for a selected image location and used for later calculations of the scattered wave particle velocity at any offset between the embedded grid and the contrast grid. On the other hand, the variables involved in determining the scattering vector include source location, image location, receiver location, polarization direction from the embedded grid and parameter perturbation values δP from the contrast grid. Changing the offset between embedded grid parameter perturbation values δP at the image location. Therefore, the scattering vector for any particular image location is recalculated when the offset between the embedded grid and the contrast grid is updated.

Figure 4:
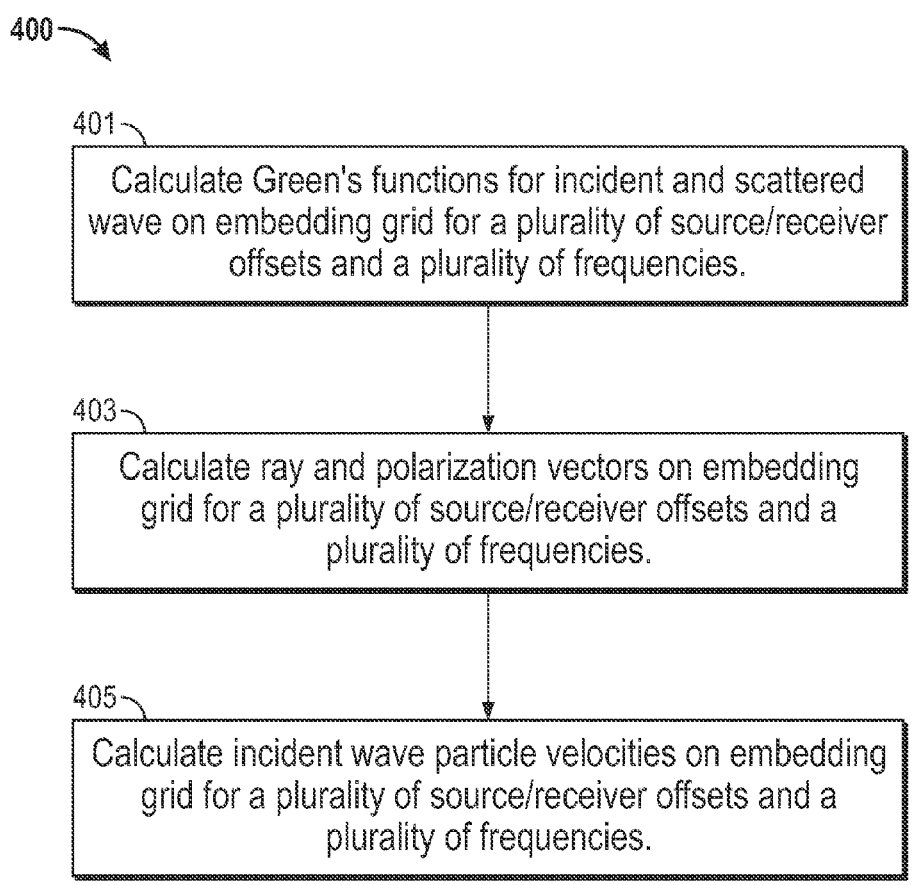
FIG. 4 shows an exemplary flow chart for determining incident wave particle velocity according to one method of the present disclosure.

FIG. 4 shows an exemplary flow chart of the present disclosure for determining incident wave particle velocity. In Box 401, Green's functions for the incident and scattered waves are calculated on the first (embedded) grid for a plurality of source/receiver offsets and a plurality of acoustic frequencies. These calculated Green's functions values are stored at a memory location. In Box 403, ray and polarization vectors are calculated on the first grid for the plurality of source/receiver offsets and are stored at a memory location. In Box 405, incident wave particle velocities are calculated on the embedding grid for a plurality of source/receiver offsets and a plurality of frequencies. The incident wave particle velocities are stored at a memory location.

Figure 5:
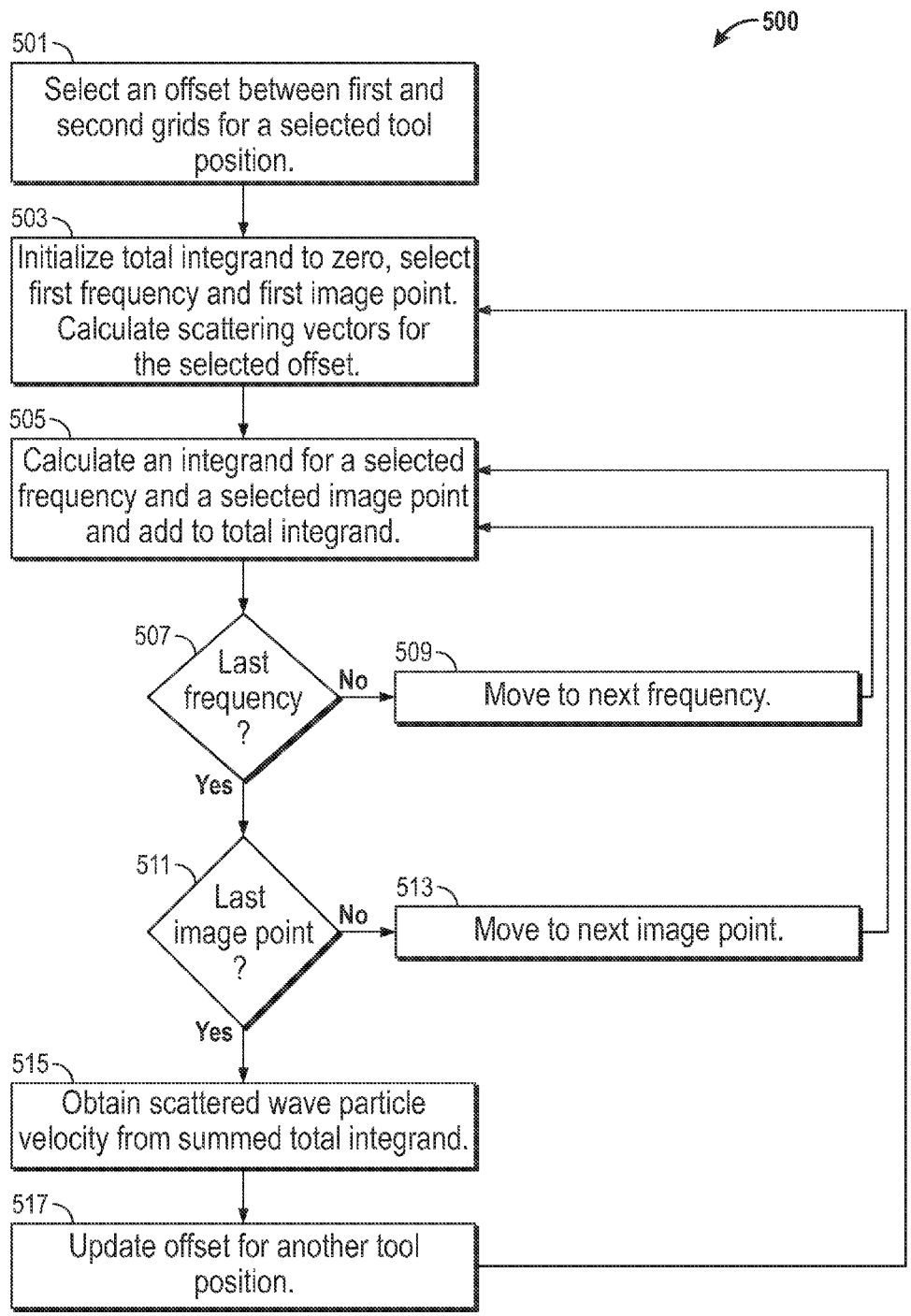
FIG. 5 shows a flowchart for determining a scattered wave particle velocity for the formation at a selected position of the borehole tool in the formation according to one method of the present disclosure.

FIG. 5 shows a flowchart for determining a scattered wave particle velocity for the formation at a selected position of the borehole tool in the formation. In Box 501, an appropriate offset between the first grid and the second grid is selected. In Box 503, a total integrand for summing scattered wave field contributions to the scattered wave particle velocity is initialized at zero. An acoustic frequency is selected. The first image location (within the scattering volume) is selected and the scattering vector is calculated for the selected image location. In Box 505, an integrand for the selected frequency and the selected image point is calculated and added to the total integrand. In Box 507, if the last frequency has not been reached, then the next frequency is selected (Box 509) and the calculation of Box 505 is repeated. Otherwise, if the last frequency has been reached, then the next image location selected. In Box 511, if the last image point has been not been reached, then the next image location is selected (Box 513) and the process returns to the calculation of Box 505. Otherwise, if the last image point has been reached, then the resulting integrand yields the scattered wave particle velocity (Box 515). In Box 517, the borehole tool is moved to a new tool position and consequently the offset between the first grid and the second grid is updated. The process may then return to Box 503 to begin the process of determining the scattered wave particle velocity at the new tool position. For process loops from Box 517 using updated offsets, fewer calculations need to be performed than in the first run through the flowchart, thereby speeding up calculation times. The scattered wave particle velocities at each offset can be added to the incident wave particle velocities obtained from the process of flowchart 400 (FIG. 4) to obtain total wave particle velocities at each offset.

In one aspect of the present disclosure, the methods disclosed herein may be performed using a downhole processor to obtain the scattered wave particle velocity in real time. Implicit in the processing of data used herein is the use of a computer program on a suitable machine-readable medium that enables a processor to perform the processing of data. The machine-readable medium may include ROMs, EPROMs, EEPROMs, Flash Memories and Optical disks.

Therefore, in one aspect of the present disclosure, a method of determining a scattered wave particle velocity for a formation is provided, the method including: defining an embedded grid of the formation; defining a contrast grid of the formation that includes a contrast feature of the formation; calculating a Green's function over the embedded grid; calculating a first scattering vector of the contrast feature for a first offset between the embedded grid and the contrast grid; determining the scattered wave particle velocity for the contrast feature at the first offset using the calculated Green's function and the first scattering vector; calculating a second scattering vector of the contrast feature for a second offset between the embedded grid and the contrast grid; and determining the scattered wave particle velocity for the contrast feature at the second offset using the calculated Green's function and the second scattering vector. The Green's function may be calculated once and used for determining the first scattered wave particle velocity and the second scattered wave particle velocity. In an exemplary embodiment, the method includes calculating a scattered waver particle velocity using the equation:

$$\hat{v}^{SC;\odot\oplus}(x') = \hat{T}\int_{x\in D^{SC}\cap D}\hat{G}_\odot(x, x'')A^{\odot\oplus}(x'', x, x'; \xi, \delta P)\hat{G}_\oplus(x', x)dV(x)$$

where $\hat{v}^{SC;\odot\oplus}((x')$ is the scattered wave particle velocity, $\hat{T}$ is the source signature, $D^{SC}\cap D$ is the integration volume, $\hat{G}_\odot(x, x'')$ is a Green's function for an incident wave field having polarization $\odot$, $\hat{G}_\oplus(x', x)$, is a Green's function for a scattered wave field having polarization $\oplus$, $A^{\odot\oplus}(x'', x, x'; \xi, \delta P)$ represents the scattering vector related to the contrast feature. Calculating the first scattering vector and the second scattering vector may include using perturbation parameters of the contrast feature assigned to the contrast grid. The perturbation parameter value of the contrast grid may be is related to a parameter value obtained from seismic logging of the formation. The parameter may include, for example, a bulk modulus; a shear modulus; and a density. Calculating the Green's function further includes calculating a Green's function of an wave field incident at the image point from a source location and calculating a Green's function of a wave field scattered at the image location and received at a receiver location.

In another aspect, the present disclosure provides a computer-readable medium having instructions stored therein and accessible to a process to enable the processor to perform a method for determining a scattered wave particle velocity for a formation, wherein the method includes: defining an embedded grid of the formation; defining a contrast grid of the formation that includes a contrast feature of the formation; calculating a Green's function over the embedded grid; calculating a first scattering vector of the contrast feature for a first offset between the embedded grid and the contrast grid; determining the scattered wave particle velocity for the contrast feature at the first offset using the calculated Green's function and the first scattering vector; calculating a second scattering vector of the contrast feature for a second offset between the embedded grid and the contrast grid; and determining the scattered wave particle velocity for the contrast feature at the second offset using the calculated Green's function and the second scattering vector. The Green's function may be calculated once and used to determine the first scattered wave particle velocity and the second scattered wave particle velocity. The scattered waver particle velocity using the equation:

$$\hat{v}^{SC;\odot\oplus}(x') = \hat{T}\int_{x\in D^{sc}\cap D} \hat{G}_{\odot}(x,x'')A^{\odot\oplus}(x'',x,x';\xi,\delta P)\hat{G}_{\oplus}(x',x)dV(x)$$

where $\hat{v}^{SC;\odot\oplus}(x')$ is the scattered wave particle velocity, $\hat{T}$ is the source signature, $D^{SC}\cap D$ is the integration volume, $\hat{G}_{\odot}(x,x'')$ is a Green's function for an incident wave field having polarization $\odot$, $\hat{G}_{\oplus}(x',x)$, is a Green's function for a scattered wave field having polarization $\oplus$, $A^{\odot\oplus}(x'',x,x';\xi,\delta P)$ represents the scattering vector related to the contrast feature. Calculating the first scattering vector and the second scattering vector further comprises using perturbation parameters of the contrast feature assigned to the contrast grid. The perturbation parameter value of the contrast grid is typically related to a parameter value obtained from seismic logging of the formation. The parameter may include, for example, a bulk modulus; a shear modulus; and a density. Calculating the Green's function further includes calculating a Green's function of an wave field incident at the image point from a source location and calculating a Green's function of a wave field scattered at the image location and received at a receiver location.

While the foregoing disclosure is directed to the certain exemplary embodiments of the disclosure, various modifications will be apparent to those skilled in the art. It is intended that all variations within the scope and spirit of the appended claims be embraced by the foregoing disclosure.

What is claimed is:

1. A method of determining a scattered wave particle velocity for a formation, comprising:
   defining an embedded grid of the formation;
   defining a contrast grid of the formation that includes a contrast feature of the formation;
   calculating a Green's function over the embedded grid;
   calculating a first scattering vector of the contrast feature for a first offset between the embedded grid and the contrast grid;
   determining the scattered wave particle velocity for the contrast feature at the first offset using the calculated Green's function and the first scattering vector;
   calculating a second scattering vector of the contrast feature for a second offset between the embedded grid and the contrast grid; and
   determining, using a computer processor, the scattered wave particle velocity for the contrast feature at the second offset using the calculated Green's function and the second scattering vector.

2. The method of claim 1, further comprising calculating the Green's function once and using the calculated Green's function for determining the first scattered wave particle velocity and the second scattered wave particle velocity.

3. The method of claim 1, further comprising calculating a scattered wave particle velocity using the equation:

$$\hat{v}^{SC;\odot\oplus}(x') = \hat{T}\int_{x\in D^{sc}\cap D} \hat{G}_{\odot}(x,x'')A^{\odot\oplus}(x'',x,x';\xi,\delta P)\hat{G}_{\oplus}(x',x)dV(x)$$

where $\hat{v}^{SC;\odot\oplus}(x')$ is the scattered wave particle velocity, $\hat{T}$ is the source signature, $D^{SC}\cap D$ is the integration volume, $\hat{G}_{\odot}(x,x'')$ is a Green's function for an incident wave field having polarization $\odot$, $\hat{G}_{\oplus}(x',x)$, is a Green's function for a scattered wave field having polarization $\oplus$, $A^{\odot\oplus}(x'',x,x';\xi,\delta P)$ represents the scattering vector related to the contrast feature.

4. The method of claim 1, wherein calculating the first scattering vector and the second scattering vector further comprises using perturbation parameters of the contrast feature assigned to the contrast grid.

5. The method of claim 1, wherein the perturbation parameter value of the contrast grid is related to a parameter value obtained from seismic logging of the formation.

6. The method of claim 1, wherein the parameter is selected from the group consisting of: (i) bulk modulus; (ii) shear modulus; and (iii) density.

7. The method of claim 1, wherein calculating the Green's function further comprises calculating a Green's function of an wave field incident at the image point from a source location and calculating a Green's function of a wave field scattered at the image location and received at a receiver location.

8. A non-transitory computer readable medium containing computer instructions stored therein for causing a computer processor to perform a method for determining a scattered wave particle velocity for a formation, the method comprising:
   defining an embedded grid of the formation;
   defining a contrast grid of the formation that includes a contrast feature of the formation;
   calculating a Green's function over the embedded grid;
   calculating a first scattering vector of the contrast feature for a first offset between the embedded grid and the contrast grid;
   determining the scattered wave particle velocity for the contrast feature at the first offset using the calculated Green's function and the first scattering vector;
   calculating a second scattering vector of the contrast feature for a second offset between the embedded grid and the contrast grid; and
   determining the scattered wave particle velocity for the contrast feature at the second offset using the calculated Green's function and the second scattering vector.

9. The non-transitory computer-readable medium of claim 8, further comprising calculating the Green's function once and using the calculated Green's function for determining the first scattered wave particle velocity and the second scattered wave particle velocity.

10. The non-transitory computer-readable medium of claim 8, further comprising calculating a scattered wave particle velocity using the equation:

$$\hat{v}^{SC;\odot\oplus}(x') = \hat{T} \int_{x \in D^{SC} \cap D} \hat{G}_\odot(x, x'') A^{\odot\oplus}(x'', x, x'; \xi, \delta P) \hat{G}_\oplus(x', x) dV(x)$$

where $\hat{v}^{SC;\odot\oplus}(x')$ is the scattered wave particle velocity, $\hat{T}$ is the source signature, $D^{SC} \cap D$ is the integration volume, $\hat{G}_\odot(x, x'')$ is a Green's function for an incident wave field having polarization $\odot$, $\hat{G}_\oplus(x', x)$, is a Green's function for a scattered wave field having polarization $\oplus$, $A^{\odot\oplus}(x'', x, x'; \xi, \delta P)$ represents the scattering vector related to the contrast feature.

11. The non-transitory computer-readable medium of claim 8, wherein calculating the first scattering vector and the second scattering vector further comprises using perturbation parameters of the contrast feature assigned to the contrast grid.

12. The non-transitory computer-readable medium of claim 8, wherein the perturbation parameter value of the contrast grid is related to a parameter value obtained from seismic logging of the formation.

13. The non-transitory computer-readable medium of claim 8, wherein the parameter is selected from the group consisting of: (i) bulk modulus; (ii) shear modulus; and (iii) density.

14. The non-transitory computer-readable medium of claim 8, wherein calculating the Green's function further comprises calculating a Green's function of an wave field incident at the image point from a source location and calculating a Green's function of a wave field scattered at the image location and received at a receiver location.

15. A method of determining a scattered wave particle velocity for a formation, comprising:
defining an embedded grid of the formation;
defining a contrast grid of the formation that includes a contrast feature of the formation;
calculating a transfer function over the embedded grid;
calculating a first scattering vector of the contrast feature for a first offset between the embedded grid and the contrast grid;
determining the scattered wave particle velocity for the contrast feature at the first offset using the calculated transfer function and the first scattering vector;
calculating a second scattering vector of the contrast feature for a second offset between the embedded grid and the contrast grid; and
determining, using a computer processor, the scattered wave particle velocity for the contrast feature at the second offset using the calculated transfer function and the second scattering vector.

\* \* \* \* \*